(12) United States Patent
He et al.

(10) Patent No.: US 10,519,026 B2
(45) Date of Patent: Dec. 31, 2019

(54) WATER DISPENSER, WATER DISPENSING APPARATUS AND WATER DISPENSING REMINDER SYSTEM

(71) Applicant: BOE TECHNOLOGY GROUP CO., LTD., Beijing (CN)

(72) Inventors: Xuan He, Beijing (CN); Yuanming Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 240 days.

(21) Appl. No.: 15/534,483

(22) PCT Filed: May 30, 2016

(86) PCT No.: PCT/CN2016/083904
§ 371 (c)(1),
(2) Date: Jun. 8, 2017

(87) PCT Pub. No.: WO2017/156884
PCT Pub. Date: Sep. 21, 2017

(65) Prior Publication Data
US 2018/0093876 A1    Apr. 5, 2018

(30) Foreign Application Priority Data

Mar. 18, 2016 (CN) .......................... 2016 1 0158956

(51) Int. Cl.
*B67D 3/00* (2006.01)
*G08B 21/24* (2006.01)
*A47J 31/56* (2006.01)

(52) U.S. Cl.
CPC ............ *B67D 3/0041* (2013.01); *A47J 31/56* (2013.01); *B67D 3/00* (2013.01); *B67D 3/0074* (2013.01);
(Continued)

(58) Field of Classification Search
CPC ...... B67D 3/0041; B67D 3/00; B67D 3/0074; B67D 2210/00099; G08B 21/24; A47J 31/56
See application file for complete search history.

(56) References Cited

U.S. PATENT DOCUMENTS 6,173,117 B1 * 1/2001 Clubb ................... A47J 31/401
222/146.5
7,091,865 B2 * 8/2006 Cuddihy ............. G06F 19/3418
340/573.1
(Continued)

FOREIGN PATENT DOCUMENTS

CN        1658246 A       8/2005
CN      103565648 A       2/2014
(Continued)

OTHER PUBLICATIONS

Machine Translation of CN104921599, Sep. 23, 2015, all pages (Year: 2015).*
(Continued)

*Primary Examiner* — Nicolas A Arnett
(74) *Attorney, Agent, or Firm* — Kinney & Lange, P.A.

(57) ABSTRACT

Embodiments of the present disclosure relate to a water dispenser, a water dispensing apparatus and a water dispensing reminder system. The water dispenser comprises a communication module and a water volume detection module which is configured to detect a water volume received by a user with a drinking vessel and output a result of the detection of the water volume through the communication module. The water dispensing apparatus comprises: the water dispenser, and an electronic device comprising at least one of a vital sign sensor and a motion sensor, and a signal transmission module; the vital sign sensor being configured to detect a vital sign information of a human body and to output the vital sign information through the signal trans-
(Continued)

mission module, and the motion sensor being configured to detect a motion information of a human body and to output the motion information through the signal transmission module into the water dispensing reminder system. The communication module of the water dispenser and the signal transmission module of the electronic device are configured so as to transmit related information into the water dispensing reminder system, such that the water dispensing reminder system synthesizes the water volume received by the user or the vital sign information or the motion information of the human body which information may reflect conditions of the human body to determine a timing for providing a drinking reminder, so as to send a drinking reminder message in a more accurate manner.

19 Claims, 3 Drawing Sheets

(52) U.S. Cl.
CPC .... *G08B 21/24* (2013.01); *B67D 2210/00099* (2013.01)

(56) References Cited

U.S. PATENT DOCUMENTS

| | | | | |
|---|---|---|---|---|
| 7,287,392 | B2* | 10/2007 | Brand | B67D 3/0009 |
| | | | | 222/146.6 |
| 8,066,151 | B2* | 11/2011 | Valvano, Jr. | A47K 5/1217 |
| | | | | 137/487.5 |
| 8,378,830 | B2* | 2/2013 | Moran | G01F 1/075 |
| | | | | 222/243 |
| 8,884,752 | B2* | 11/2014 | Tai | G06Q 50/24 |
| | | | | 340/539.12 |
| 9,230,423 | B2* | 1/2016 | Wu | G08B 21/24 |
| 9,911,306 | B2* | 3/2018 | Tshilombo | G08B 21/182 |
| 10,232,996 | B2* | 3/2019 | Bentkovski | B65D 51/248 |
| 2005/0181771 | A1* | 8/2005 | Cuddihy | G06F 19/3418 |
| | | | | 455/414.1 |
| 2010/0283601 | A1* | 11/2010 | Tai | G06Q 50/24 |
| | | | | 340/539.12 |
| 2011/0149693 | A1 | 6/2011 | Liao | |
| 2012/0248141 | A1* | 10/2012 | Sano | B67D 3/0003 |
| | | | | 222/67 |
| 2014/0046596 | A1* | 2/2014 | Chang | G16H 40/63 |
| | | | | 702/3 |
| 2014/0340229 | A1* | 11/2014 | Wu | G08B 21/24 |
| | | | | 340/603 |
| 2017/0158388 | A1* | 6/2017 | Bentkovski | B65D 51/248 |
| 2017/0263102 | A1* | 9/2017 | Tshilombo | G08B 21/182 |

FOREIGN PATENT DOCUMENTS

| | | |
|---|---|---|
| CN | 104095537 A | 10/2014 |
| CN | 104257232 A | 1/2015 |
| CN | 204181382 U | 3/2015 |
| CN | 104510343 A | 4/2015 |
| CN | 204303140 U | 4/2015 |
| CN | 104720593 A | 6/2015 |
| CN | 204410580 A | 6/2015 |
| CN | 104764506 A | 7/2015 |
| CN | 204500351 U | 7/2015 |
| CN | 204500373 A | 7/2015 |
| CN | 104825024 A | 8/2015 |
| CN | 104921599 A | 9/2015 |
| CN | 204743770 U | 11/2015 |
| CN | 204765092 U | 11/2015 |
| CN | 204765100 U | 11/2015 |
| CN | 105120737 A | 12/2015 |
| CN | 105147008 A | 12/2015 |
| CN | 105595838 A | 5/2016 |
| CN | 205658768 U | 10/2016 |
| JP | 2009245171 A | 10/2009 |

OTHER PUBLICATIONS

Rob Williams, Mionix Labs NOAS QG Mouse Tracks Your Vital Signs While You Get Your Frag on, Dec. 5, 2014, https://hothardware.com/news/mionix-labs-noas-qg-mouse-tracks-your-vital-signs-while-get-your-frag-on (Year: 2014).*
International Search Report and Written Opinion dated Dec. 19, 2016, for corresponding PCT Application No. PCT/CN2016/083904.
First Chinese Office Action, for Chinese Patent Application No. 201610158956.3, dated Nov. 10, 2017, 24 pages.

* cited by examiner

WATER DISPENSER, WATER DISPENSING APPARATUS AND WATER DISPENSING REMINDER SYSTEM

CROSS-REFERENCE TO RELATED INVENTION

The present disclosure claims the benefit of Chinese Patent Application Invention No. 201610158956.3 filed on Mar. 18, 2016 in the State Intellectual Property Office of China, the whole disclosure of which is incorporated herein by reference.

BACKGROUND OF THE INVENTION

Field of the Invention

Embodiments of the present disclosure relate to the technical field of an electronical appliance and in particular, to a water dispenser, a water dispensing apparatus and a water dispensing reminder system.

Description of the Related Art

With a growth in a living standard and a progress in science and technology, more and more attentions are paid to personal health in terms of diet and life. An idea that drinking water is benefit for physical health has been more widely accepted by people; however, drinking water is frequently forgotten.

In order to help to cultivate a habit of drinking water, some reminder systems for reminding a user of drinking are proposed by conventional technical devices, which systems remind people regularly of drinking, without taking into account of conditions of practical physical requirements of the user, such that a reminder message may not be produced and delivered accurately at times.

SUMMARY OF THE INVENTION

The embodiments of the present disclosure have been made to overcome or alleviate at least one aspect of the above mentioned disadvantages and/or shortcomings in the prior art. In embodiments of the disclosure, a water dispenser, a water dispensing apparatus and a water dispensing reminder system are provided, for enhancing accuracy of emitted reminder message.

In a first aspect of the present disclosure, a water dispenser is provided by an embodiment thereof, comprising: a water volume detection module, configured to detect a water volume received by a user with a drinking vessel; and a communication module, arranged to be connected with the water volume detection module and configured to output the water volume received by the user which is detected by the water volume detection module.

According to an exemplary embodiment of the disclosure, the water volume detection module comprises a pressure sensor; the water dispenser comprises a carrier table configured to support the drinking vessel; and the pressure sensor is disposed on the carrier table.

According to an exemplary embodiment of the disclosure, the water dispenser further comprises a water temperature controller configured to hold an outlet water temperature of the water dispenser within a predetermined temperature range.

According to an exemplary embodiment of the disclosure, the water dispenser further comprises at least one of a temperature sensor and a humidity sensor, wherein the temperature sensor is arranged to be in communication with the communication module and is configured to sense a temperature information at a position where the water dispenser is located and to output the temperature information through the communication module; and/or the humidity sensor is arranged to be in communication with the communication module and is configured to sense a humidity information at a position where the water dispenser is located and to output the humidity information through the communication module.

According to an exemplary embodiment of the disclosure, the water dispenser further comprises a reminder module which is arranged to be in communication with the communication module and configured to transmit a drinking reminder signal when the communication module receives a drinking reminder message.

According to an exemplary embodiment of the disclosure, the reminder module comprises a reminder lamp, and the drinking reminder signal comprises a light signal.

According to an exemplary embodiment of the disclosure, the water dispenser further comprises a drinking vessel sensing module which is arranged to be in communication with the communication module and configured for sensing whether the drinking vessel is disposed at a water-receiving position and to output a result of the sensing through the communication module.

In a second aspect of the present disclosure, a water dispensing apparatus is provided by an embodiment thereof, comprising:

the water dispenser as above; and
an electronic device comprising:
a. at least one of a vital sign sensor and a motion sensor, the vital sign sensor being configured to be adapted to detect a vital sign information of a human body while the motion sensor being configured to detect a motion information of a human body; and
b. a signal transmission module configured to output at least one of the vital sign information of the human body detected by the vital sign sensor and the motion information of the human body detected by the motion sensor.

According to an exemplary embodiment of the disclosure, the electronic device is a mouse; and the motion sensor is configured to detect the motion information of a human body, comprising an operation information concerning an operation of the mouse by hand.

In a third aspect of the present disclosure, a water dispensing reminder system for aforementioned water dispensing apparatus is provided by an embodiment thereof, comprising:

a drinking planning unit, configured to determine a drinking plan of the user within a predetermined time period;

a drinking water volume acquisition unit, configured to determine the water volume received by the user within the predetermined time period, depending on an information concerning the water volume which is transmitted by the communication module of the water dispenser; and a determination unit, configured to determine whether it is necessary to remind the user of drinking depending on the water volume acquired by the drinking water volume acquisition unit and the drinking plan determined by the drinking planning unit, and to output a drinking reminder message when a result of the determination thereby is YES.

According to an exemplary embodiment of the disclosure, the drinking planning unit being configured to determine a drinking plan of the user within a predetermined time period comprises: determining the drinking plan of the user within the predetermined time period depending on at least one of a temperature information and a humidity information transmitted by the communication module of the water dispenser.

According to an exemplary embodiment of the disclosure, the determination unit being configured to output a drinking reminder message comprises: outputting the drinking reminder message to the communication module of the water dispenser.

According to an exemplary embodiment of the disclosure, the water dispensing reminder system further comprises a display module, and the determination unit being configured to output a drinking reminder message comprises: outputting the drinking reminder message by the display module.

According to an exemplary embodiment of the disclosure, the water dispensing reminder system further comprises the above electronic devices, and the drinking planning unit is further configured to adjust the determined drinking plan depending on at least one of the vital sign information and the motion information transmitted by the electronic device.

According to an exemplary embodiment of the disclosure, the drinking planning unit is further configured to adjust the determined drinking plan depending on the water volume acquired by the drinking water volume acquisition unit.

According to an exemplary embodiment of the disclosure, the water dispensing apparatus comprises at least two water dispensers; and the drinking water volume acquisition unit being configured to determine the water volume received by the user within the predetermined time period depending on an information concerning the water volume which is transmitted by the communication module of the water dispenser comprises: determining the water volume received by the user within the predetermined time period depending on the information concerning the water volume transmitted by communication modules of the water dispensers.

According to an exemplary embodiment of the disclosure, the determination unit being configured to determine whether it is necessary to remind the user of drinking depending on the water volume acquired by the drinking water volume acquisition unit and the drinking plan determined by the drinking planning unit, and to output a drinking reminder message when a result of the determination thereby is YES comprises: determining whether the drinking vessel is disposed at the water-receiving position depending on the result of the sensing transmitted by the communication module, and outputting the drinking reminder message when a result of the determination concerning the water-receiving position thereby is NO.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF PREFERRED EMBODIMENTS OF THE INVENTION

Figure 1:
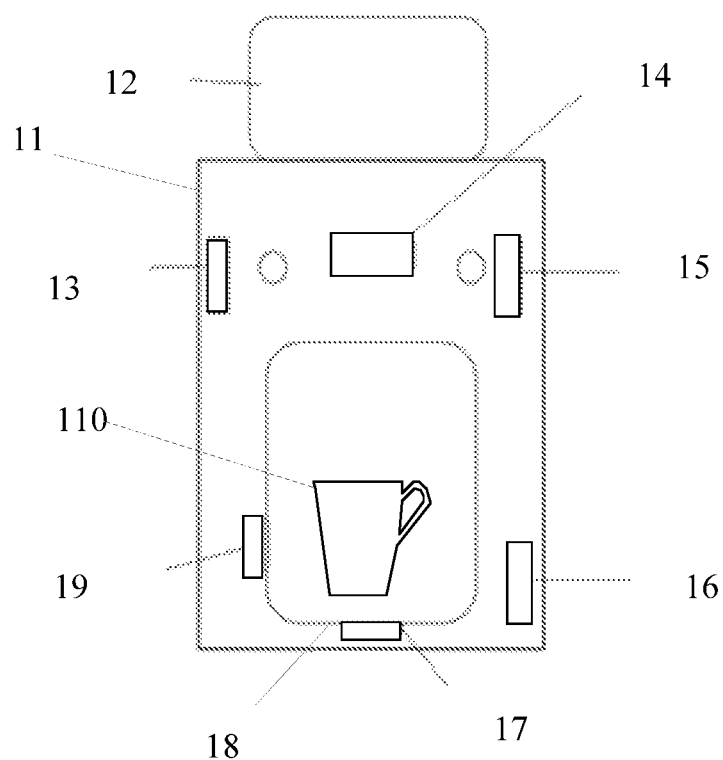
FIG. 1 illustrates a structural schematic view of a water dispenser provided by an embodiment of the disclosure.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of various components in the drawings are only intended to exemplarily illustrate the contents of the disclosure, rather than to demonstrate the practical dimension or proportion of components of the water dispenser, the water dispensing apparatus and the water dispensing reminder system of embodiments of the disclosure.

By way of example, the water dispenser, the water dispensing apparatus and the water dispensing reminder system cooperate with one another so as to implement a drinking reminder for a user, providing an improved accuracy as compared with conventional technical means. Among others, the water dispensing reminder system synthetically takes into account of information which may be provided by the water dispenser, and the electronic device, and may reflect whether the user needs to drink water, so as to determine whether it is necessary to remind the user of drinking water, such that a more accurate reminder may be provided for the user, facilitating enhancement of user experience; the water dispenser and the electronic device may deliver information which may reflect a condition whether the user is short of water, e.g., the water volume received by the user, the vital sign information and the motion information, to the water dispensing reminder system, such that on the basis of such information, the water dispensing reminder system may determine more accurately the necessity and the timing of reminding the user of drinking water. Specific descriptions are provided hereinafter in details with reference to the attached drawings.

According to a general technical concept of the present disclosure, there is provided a water dispenser, comprising: a communication module and a water volume detection module which is arranged to be in communication with the communication module and configured to detect a water volume received by the user with a drinking vessel and to output a result of the detection of the water volume through the communication module.

Referring to FIG. 1, in an embodiment of the water dispenser, by way of example, the water dispenser comprises: a body 11; a bucket 12 provided on the body 11; a communication module 13, a reminder module 14, a water temperature controller 15, a temperature/humidity sensor 16, a pressure sensor 17, a carrier table 18 and a drinking vessel sensing device 19 which are provided inside the body 11.

Among others, the pressure sensor 17 is provided on the carrier table 18 and arranged to be in communication with the communication module 13 (for convenience of illustration, specific circuit connection relationship is not illustrated in FIG. 1, similarly hereinafter), for detecting the water volume received by the user and for outputting the detected water volume which is received by the user, through the communication module 13.

In the embodiment, since the aforementioned pressure sensor 17 and wireless communication module 13 is provided inside the water dispenser, then the water dispenser as illustrated in FIG. 1 is capable of transmitting the detected water volume which is received by the user, to the water dispensing reminder system. As such, the water dispensing reminder system is configured, such that the water dispensing reminder system is capable of determining a timing for outputting a water dispensing reminder message more accurately depending on the detected water volume which is transmitted by the water dispenser.

It may be readily appreciated that, in an embodiment of the disclosure, the pressure sensor 17 is used to detect the water volume received by the user, such that the pressure sensor 17 constitutes a water volume detection module; however, in some alternative embodiments, the pressure sensor 17 may alternatively be other structures which may implement detection of the water volume, e.g., a flowmeter which is provided at a water outlet for determining the water volume received by the user; and such alternative structures are not exhaustively listed one by one herein, for brevity.

It may be readily appreciated that, the expression "outputting the detected water volume which is received by the user, through the communication module 13" herein specifically refers to outputting to a device or a system outside the water dispenser, to which device/system it is output may be configured specifically, as required by the user. In an embodiment of the disclosure, the communication module is configured exemplarily so as to output the detected water volume as received by the user to the water dispensing reminder system.

During practical implementation, for example, the communication module 13 herein is a functional assembly which is provided with a wired or wireless communication capability, e.g., Near Field Communication, such as infrared, Bluetooth, WIFI, and the like.

By way of example, the water temperature controller 15 is configured to hold an outlet water temperature of the water dispenser within a predetermined temperature range. In this way, the temperature of the water received by the user may be maintained within the predetermined temperature range. Furthermore, by a reasonable setting-up of the predetermined temperature range (e.g., the predetermined temperature range exemplarily refers to a range of 18-45° C.), the temperature of the water received by the user may be maintained within an optimized temperature range. As to a specific setting-up of the water temperature controller 15 and a specific manner of controlling the outlet water temperature of the water dispenser by the water temperature controller, conventional technical solutions may be referred to, and embodiments of the disclosure may not set forth in this connection in details herein.

The temperature/humidity sensor 16 is in communication with the communication module 13, for sensing a temperature/humidity at a position where the water dispenser is located and for outputting the temperature/humidity through the communication module 13 to the water dispensing reminder system.

In environments differing in temperature/humidity, the respective demand of a human body for water may be different from one another, e.g., in a case of a relatively high temperature or a relatively low humidity, there is typically a larger demand of a human body for water. In the embodiments of the disclosure, by providing above temperature/humidity sensor 16, then corresponding water dispensing reminder system is enabled to acquire the temperature/humidity at the position where the water dispenser is located and to make or adjust a corresponding drinking plan depending on the temperature/humidity, such that the drinking plan thus made or adjusted conforms better to the demand of the human body for water.

During specific implementation, the temperature/humidity sensor 16 may be replaced with a temperature sensor or a humidity sensor, so as to transmit only temperature information or humidity information to the water dispensing reminder system, such that the water dispenser may make a corresponding drinking plan on the basis of the temperature information or the humidity information.

By way of example, the reminder module 14 may be in communication with the communication module 13, for emitting a drinking reminder signal when the communication module 13 receives a drinking reminder message emitted by the water dispending reminder system.

Specifically, for example, the reminder module 14 refers to a reminder lamp, while the drinking reminder signal refers to a light signal; alternatively, for example, the reminder module 14 refers to a sound output device, e.g., a loudspeaker, while the drinking reminder signal refers to a sound signal; or otherwise, for example, the reminder module 14 comprises both a reminder lamp and a sound output device, while the drinking reminder signal comprises both a light signal and a sound signal. Certainly, during specific implementation, the reminder module 14 may alternatively be implemented in other ways.

The drinking vessel sensing module 19 is in communication with the communication module 13 and configured for sensing whether the drinking vessel 110 is disposed at a water-receiving position and for outputting a result of the sensing through the communication module 13 to the water dispensing reminder system. As such, when the communication module 13 receives the drinking reminder message transmitted by the water dispensing reminder system, the water dispending reminder system determines whether the drinking vessel is disposed at the water-receiving position on the basis of the result of the sensing. Then the reminder module 14 does not emit the reminder message any longer in a case that the result of the determination concerning the water-receiving position thereby is YES; or otherwise, the reminder module 14 emits the reminder message in a case that the result of the determination concerning the water-receiving position thereby is NO, such that the user experience may be enhanced further.

It may be readily appreciated that, in order to achieve a basic aim of the disclosure, the reminder module 14, the water temperature controller 15, the temperature/humidity sensor 16, the drinking vessel sensing module 19 as above are all optional structure. The implementation of the disclosure may not be influenced in a case that one or more of these components are in absence. In addition, specific embodiment of these various modules as above may not influence designs of other modules, corresponding technical solution thus falling within the scope of protection of the disclosure.

Figure 2:
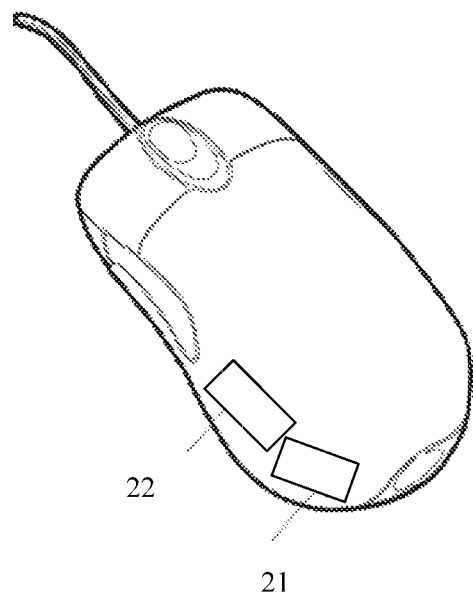
FIG. 2 illustrates a structural schematic view of an electronic device provided by an embodiment of the disclosure.

In a second aspect, a water dispensing apparatus is provided by an embodiment of the disclosure, comprising the above water dispenser and an electronic device which specifically refers to a mouse, a keyboard, or a bracelet apparatus; by way of example, the electronic device herein specifically refers to Computer Peripherals, e.g., the mouse as mentioned above. The mouse will be taken for example hereinafter. Referring to FIG. 2, the mouse exemplarily comprises:

a vital sign sensor 21 and a motion sensor 22, as well as a signal transmission module (omitted for brevity), and the vital sign sensor 21 is in communication with the signal transmission module for detecting a vital sign information of a human body and for outputting the vital sign information through the signal transmission module into the water dispensing reminder system; and the motion sensor 22 is in communication with the signal transmission module for detecting a motion information of a human body and for outputting the motion information through the signal transmission module into the water dispensing reminder system.

In this embodiment, since the vital sign sensor 21 and the motion sensor 22 as well as the signal transmission module are provided with the mouse, then the mouse is enabled to transmit the vital sign information and the motion information of the human body to the water dispensing reminder system. At the same time, as such, by setting up the water dispending reminder system, the water dispensing reminder system is enabled to determine the timing for sending the drinking reminder message on the basis of the vital sign information and the motion information of the human body.

In a third aspect, a water dispensing reminder system is provided by an embodiment of the disclosure, for above water dispensing apparatus.

Figure 3:
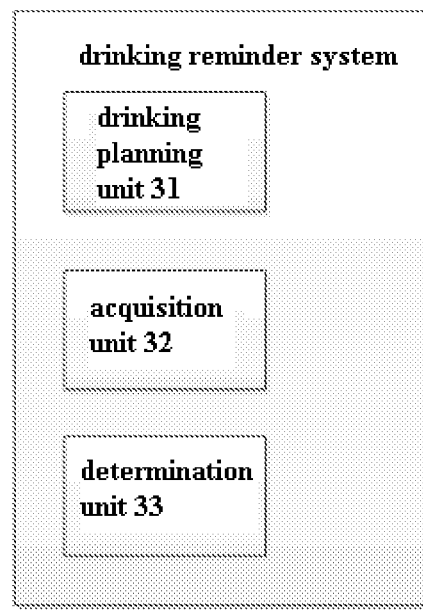
FIG. 3 illustrates a structural schematic view of a water dispensing reminder system provided by an embodiment of the disclosure.

Referring to FIG. 3, the water dispensing reminder system comprises:

a drinking planning unit 31, configured to determine a drinking plan of the user within a predetermined time period;

a drinking water volume acquisition unit 32, configured to determine the water volume received by the user within the predetermined time period, depending on an information concerning the water volume which is transmitted by the communication module 13 of the water dispenser; and a determination unit 33, configured to determine whether it is necessary to remind the user of drinking depending on the water volume acquired by the drinking water volume acquisition unit 32 and the drinking plan determined by the drinking planning unit 31, and to output a drinking reminder message when a result of the determination thereby is YES The water dispensing reminder system provided by the embodiment of the disclosure determines the necessity whether the user is to be reminded of drinking water, on the basis of the detected water volume as transmitted by the communication module of the water dispenser and the drinking plan thus made, so as to ensure that the timing for reminding the user is determined more accurately.

During specific implementation, the drinking planning unit 31 being configured to determine a drinking plan of the user within a predetermined time period comprises, for example: determining the drinking plan of the user within the predetermined time period depending on at least one of a temperature information and a humidity information transmitted by the communication module 13 of the water dispenser.

A benefit for above specific implementation lies in that, a corresponding drinking plan is made in view of the temperature/humidity information of the environment, such that the drinking plan thus made conforms better to the demand of the human body for water in the environment with corresponding temperature/humidity. The drinking planning unit 31 also makes the drinking plan in other ways (e.g., way(s) of conventional technical solutions), for example, and the implementation of the disclosure may not be influenced by specific way of making the drinking plan, corresponding technical solution thus falling within the scope of protection of the disclosure.

The predetermined time period herein is set up as desired, e.g., one day.

During specific implementation, in the course of making above drinking plan, except for a way in view of the above temperature/humidity information, the drinking plan may be made more accurately, e.g., in view of human body information of the user. By way of example, the human body information herein may be user's habitual water intake amount, user's physical condition, and occupation. These human body data are exemplarily input by the user, or alternatively obtained with Big Data Analysis by the water dispensing reminder system.

During specific implementation, the above determination unit 33 outputs the drinking reminder message, e.g., in various ways, two exemplary ones are illustrated hereinafter in details:

The first way: in a case that the reminder module is provided within the water dispenser, the determination unit 33 outputs the drinking reminder message to the communication module 13 of the water dispenser. In such way, the drinking reminder message is outputted by the water dispenser which is provided with the reminder module 14 so as to remind the user of drinking water. By way of example, in a case that the water dispensing reminder system is installed on a computer or a smartphone, e.g., a communication module of the computer or the smartphone is called to interact with the communication module of the water dispenser, so as to output the drinking reminder message to the water dispenser.

The second way: the determination unit 33 outputs the drinking reminder message by a display module. By way of example, in a case that the water dispensing reminder system is installed on a computer or a smartphone, the drinking reminder message may be displayed on a display screen of the computer or the smartphone, so as to remind the user of drinking water.

During specific implementation, in a case that above water dispensing apparatus further comprises any one electronic device as above, then the drinking planning unit may be further used to adjust the drinking plan thus determined, on the basis of at least one of the vital sign information or the motion information of the human body as transmitted by the electronic device.

By way of example, when it is found that the human body does not demand supplementation of water at present on the basis of the vital sign information transmitted by the electronic device, or it is determined that the human body does not require supplementation of water in a following time period due to the fact that the human body undergoes a relatively small amount of exercise within a certain time period before the following time period on the basis of the motion information of the human body within the certain time period, then, the drinking plan is adjusted correspondingly so as to avoid reminding the user of drinking water in the certain time period. In this way, a flexible adjustment of the drinking plan may be implemented, such that the drinking plan conforms better to physical condition of the human body of the user.

During specific implementation, as an optional way, above drinking planning unit is further used to adjust the determined drinking plan on the basis of the water volume acquired by the drinking water volume acquisition unit. For example, in a case that a water volume of 1000 ml is required to be taken before a specific time point according to a predetermined drinking plan, while the user actually receives only 500 ml before the specific time point, then the predetermined drinking plan may be revised subsequently, so as to accelerate reminding the user of drinking water by increasing a number of reminder.

During specific implementation, as another optional way, in a case that the water dispensing apparatus comprises at least two water dispensers, the above drinking water volume acquisition unit 32 being configured to determine the water volume received by the user within the predetermined time period depending on an information concerning the water volume which is transmitted by the communication module of the water dispenser comprises: determining the water volume received by the user within the predetermined time period on the basis of the information concerning the water volume transmitted by communication modules of the water dispensers.

As such, the user may associate water dispensers on a plurality of occasions, e.g., a water dispenser at home or at office, with and into the water dispensing apparatus, such that the water volume transmitted by the drinking water volume acquisition unit 32 equals to be a sum of the water volume received at home and the water volume received at office by the user, thus the water volume transmitted by the drinking water volume acquisition unit 32 conforms better to an actual intake water volume by the user, facilitating ensuring accuracy of determination of drinking reminder.

During specific implementation, as an optional way, in a case that above determination unit 33 determines the necessity of reminding the user of drinking water on the basis of the water volume acquired by the drinking water volume acquisition unit 32 and the drinking plan determined by the drinking planning unit 31, the determination unit 33 further determines whether the drinking vessel is disposed at the water-receiving position on the basis of the result of the sensing transmitted by the communication module 13 of the water dispenser, and in turn determines whether to output the drinking reminder message on the basis of the result of the determination. To be specific, if it is determined that the drinking vessel is disposed at the water-receiving position on the basis of the result of sensing, then there is no drinking reminder message being outputted. As such, in a case that the user begins to receive outlet water, the outputting of the drinking reminder message is avoided.

It may be readily appreciated that, various exemplary ways of the above water dispensing reminder system may not influence one another; during specific implementation, a corresponding water dispensing reminder system may be designed according to one or more ways of the various exemplary ways.

During specific implementation, the water dispensing reminder system referred to by the embodiments of the disclosure may be installed onto a smartphone or a computer, then the above water dispensing reminder system calls a communication module of the smartphone or the computer to implement communication with the water dispenser and the above electronic device, receives the messages transmitted by the water dispenser or the electronic device, and acquires respective information (e.g., the above information concerning the water volume, vital sign information, motion information) on the basis of these messages; on the other hand, the determination unit also transmits the drinking reminder message towards the communication module of the water dispenser through the communication between the communication module of the smartphone or the computer and the electronic device. Alternatively, for example, the water dispensing reminder system itself herein may be provided with a corresponding communication module for conducting interaction of messages with the communication module of the water dispenser and the signal transmission module of the electronic device.

Figure 4:
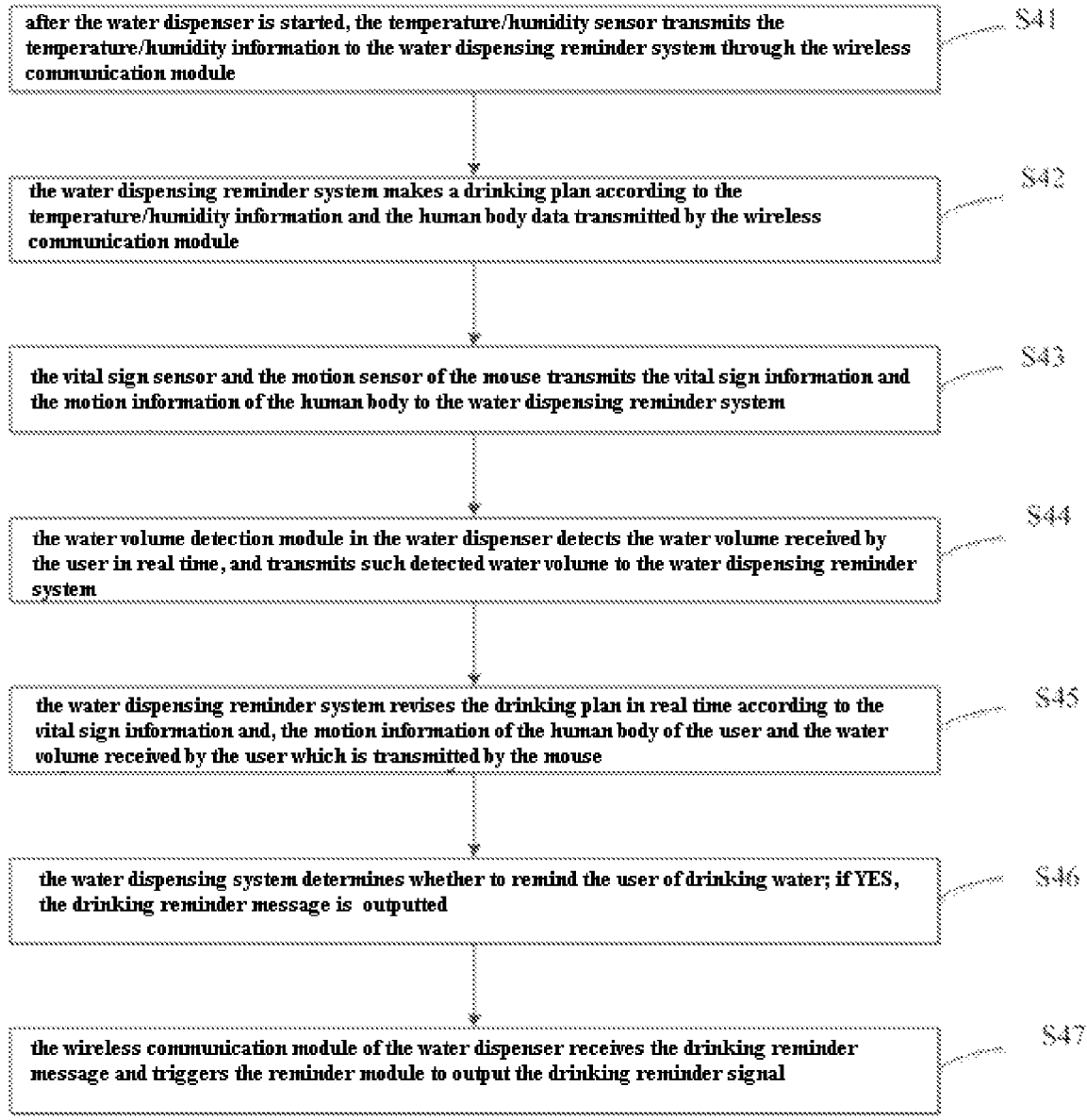
FIG. 4 illustrates a workflow chart of a water dispenser provided by an embodiment of the disclosure.

Referring to FIG. 4, in an exemplary embodiment, a workflow of the above water dispensing reminder system may comprise:

Step S41, after the water dispenser is started, the temperature/humidity sensor transmits the temperature/humidity information to the water dispensing reminder system through the wireless communication module;

Step S42, the water dispensing reminder system makes a drinking plan according to the temperature/humidity information and the human body data transmitted by the wireless communication module;

Step S43, the vital sign sensor and the motion sensor of the mouse transmits the vital sign information and the motion information of the human body to the water dispensing reminder system;

Step S44, the water volume detection module in the water dispenser detects the water volume received by the user in real time, and transmits such detected water volume to the water dispensing reminder system.

Step S45, the water dispensing reminder system revises the drinking plan in real time according to the vital sign information, the motion information of the human body of the user and the water volume received by the user which is transmitted by the mouse;

Step S46, the water dispensing system determines whether to remind the user of drinking water according to a drinking reminder plan and the detected water volume which is received by the user; if YES, then the drinking reminder message is transmitted to the communication module of the water dispenser, and the drinking reminder message is also outputted by the display module;

Step S47, the wireless communication module of the water dispenser receives the drinking reminder message and triggers the reminder module to output the drinking reminder signal.

Various embodiments of the present application have been illustrated progressively, the same or similar parts of which can be referred to each other. The differences between each embodiment and the others are described in emphasis.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A water dispenser, comprising:
   a water volume detection module, configured to detect a water volume received by a user with a drinking vessel;
   a communication module, arranged to be connected with the water volume detection module and configured to output the water volume received by the user which is detected by the water volume detection module; and
   at least one of a temperature sensor or a humidity sensor, wherein:
   in response to the temperature sensor being arranged to be in communication with the communication module, the temperature sensor is configured to sense a temperature information at a position where the water dispenser is located and to output the temperature information through the communication module; and
   in response to the humidity sensor being arranged to be in communication with the communication module, the humidity sensor is configured to sense a humidity information at a position where the water dispenser is located and to output the humidity information through the communication module.

2. The water dispenser according to claim 1, wherein the water volume detection module comprises a pressure sensor;
   the water dispenser comprises a carrier table configured to support the drinking vessel; and
   the pressure sensor is disposed on the carrier table.

3. The water dispenser according to claim 1, further comprising a water temperature controller configured to hold an outlet water temperature of the water dispenser within a predetermined temperature range.

4. The water dispenser according to claim 1, wherein the at least one of a temperature sensor or a humidity sensor at least comprises the humidity sensor.

5. The water dispenser according to claim 1, further comprising a reminder module which is arranged to be in communication with the communication module and is configured to transmit a drinking reminder signal when the communication module receives a drinking reminder message.

6. The water dispenser according to claim 5, wherein the reminder module comprises a reminder lamp, and the drinking reminder signal comprises a light signal.

7. The water dispenser according to claim 1, further comprising a drinking vessel sensing module which is arranged to be in communication with the communication module and is configured for sensing whether the drinking vessel is disposed at a water-receiving position and to output a result of the sensing through the communication module.

8. A water dispensing apparatus, comprising:
   the water dispenser according to claim 7; and
   an electronic device comprising:
   at least one of a vital sign sensor and a motion sensor, the vital sign sensor being configured to be adapted to detect a vital sign information of a human body while the motion sensor being configured to detect a motion information of a human body; and
   a signal transmission module configured to output at least one of the vital sign information of the human body detected by the vital sign sensor and the motion information of the human body detected by the motion sensor.

9. A water dispensing apparatus comprising:
   the water dispenser according to claim 1; and
   an electronic device comprising:
   at least one of a vital sign sensor and a motion sensor, the vital sign sensor being configured to be adapted to detect a vital sign information of a human body while the motion sensor being configured to detect a motion information of a human body; and
   a signal transmission module configured to output at least one of the vital sign information of the human body detected by the vital sign sensor and the motion information of the human body detected by the motion sensor.

10. The water dispensing apparatus according to claim 9, wherein the electronic device is a mouse; and
    wherein the motion sensor is configured to detect the motion information of a human body, comprising an operation information concerning an operation of the mouse by hand.

11. A water dispensing reminder system for the water dispensing apparatus according to claim 10, the water dispensing reminder system comprising:
    a drinking planning unit, configured to determine a drinking plan of the user within a predetermined time period;
    a drinking water volume acquisition unit, configured to determine the water volume received by the user within the predetermined time period, depending on an information concerning the water volume which is transmitted by the communication module of the water dispenser; and
    a determination unit, configured to determine whether it is necessary to remind the user of drinking depending on the water volume acquired by the drinking water volume acquisition unit and the drinking plan determined by the drinking planning unit, and to output a drinking reminder message when a result of the determination thereby is YES.

12. The water dispensing reminder system according to claim 11, wherein the determination unit being configured to determine whether it is necessary to remind the user of drinking depending on the water volume acquired by the drinking water volume acquisition unit and the drinking plan determined by the drinking planning unit, and to output the drinking reminder message when the result of the determination thereby is YES comprises:
    determining whether the drinking vessel is disposed at a water-receiving position depending on the result of the sensing transmitted by the communication module, and outputting the drinking reminder message when a result of the determination concerning the water-receiving position thereby is NO.

13. A water dispensing reminder system for the water dispensing apparatus according to claim 9, the water dispensing reminder system comprising:
- a drinking planning unit, configured to determine a drinking plan of the user within a predetermined time period;
- a drinking water volume acquisition unit, configured to determine the water volume received by the user within the predetermined time period, depending on an information concerning the water volume which is transmitted by the communication module of the water dispenser; and
- a determination unit, configured to determine whether it is necessary to remind the user of drinking depending on the water volume acquired by the drinking water volume acquisition unit and the drinking plan determined by the drinking planning unit, and to output a drinking reminder message when a result of the determination thereby is YES.

14. The water dispensing reminder system according to claim 13, wherein the drinking planning unit configured to determine the drinking plan of the user within the predetermined time period comprises: determining the drinking plan of the user within the predetermined time period depending on at least one of a temperature information and a humidity information transmitted by the communication module of the water dispenser.

15. The water dispensing reminder system according to claim 13, wherein the determination unit being configured to output the drinking reminder message comprises: outputting the drinking reminder message to the communication module of the water dispenser.

16. The water dispensing reminder system according to claim 13, further comprising a display module, wherein the determination unit being configured to output the drinking reminder message is further configured for: outputting the drinking reminder message by the display module.

17. The water dispensing reminder system according to claim 13,
wherein the drinking planning unit is further configured to adjust the determined drinking plan depending on at least one of the vital sign information and the motion information transmitted by the electronic device.

18. The water dispensing reminder system according to claim 13, wherein the drinking planning unit is further configured to adjust the determined drinking plan depending on the water volume acquired by the drinking water volume acquisition unit.

19. The water dispensing reminder system according to claim 13, wherein the water dispensing apparatus comprises at least two water dispensers; and
wherein the drinking water volume acquisition unit being configured to determine the water volume received by the user within the predetermined time period depending on the information concerning the water volume which is transmitted by the communication module of the water dispenser comprises: determining the water volume received by the user within the predetermined time period depending on the information concerning the water volume transmitted by communication modules of the water dispensers.

* * * * *